E. B. H. TOWER, Jr. & R. H. VAN NEST.
WELDING CONTROLLER.
APPLICATION FILED JULY 19, 1915.
1,289,020.
Patented Dec. 24, 1918.
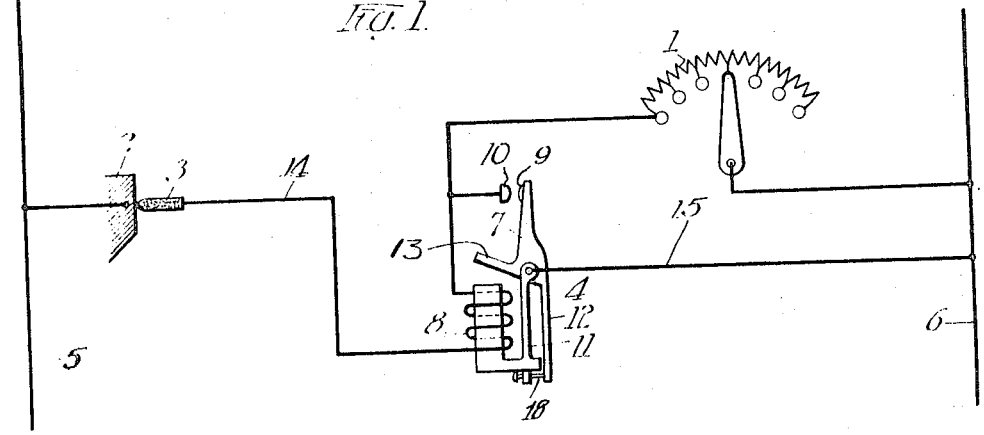
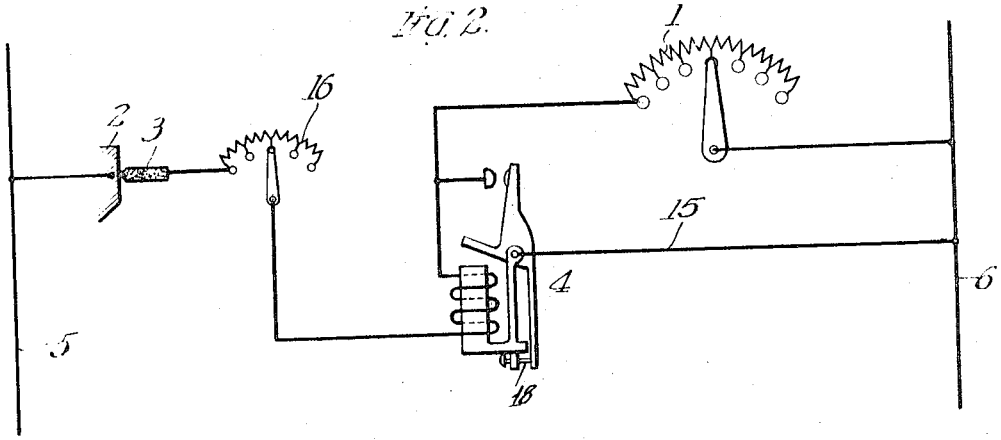
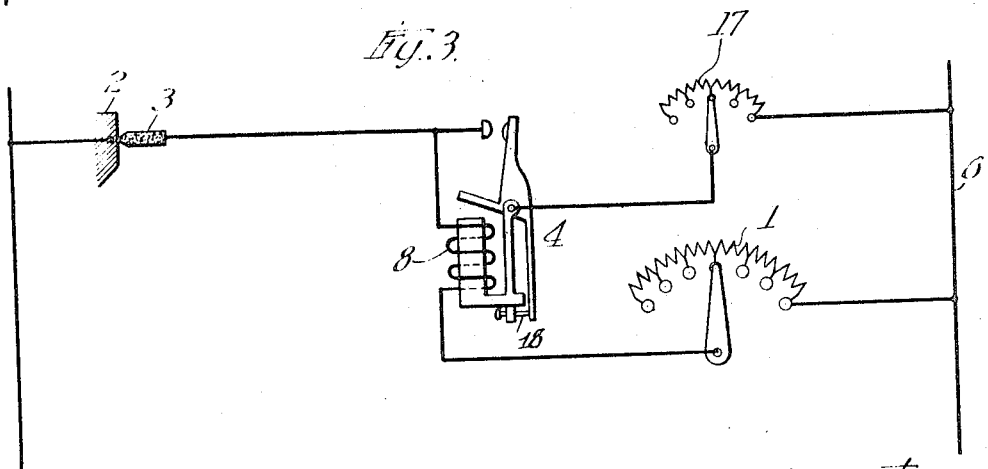
Witnesses:
Robert H. Weir
Arthur W. Carlson
Inventors:
Edwin B. H. Tower Jr
Raymond H. Van Nest
By Edwin B. H. Tower Jr. Atty

UNITED STATES PATENT OFFICE.

EDWIN B. H. TOWER, JR., OF MILWAUKEE, WISCONSIN, AND RAYMOND H. VAN NEST, OF NIAGARA FALLS, NEW YORK, ASSIGNORS TO THE CUTLER-HAMMER MFG. CO., OF MILWAUKEE, WISCONSIN, A CORPORATION OF WISCONSIN.

WELDING-CONTROLLER.

1,289,020.　　　　Specification of Letters Patent.　　Patented Dec. 24, 1918.

Application filed July 19, 1915. Serial No. 40,729.

*To all whom it may concern:*

Be it known that we, EDWIN B. H. TOWER, Jr., and RAYMOND H. VAN NEST, citizens of the United States, residing, respectively, at Milwaukee, in the county of Milwaukee and State of Wisconsin, and Niagara Falls, in the county of Niagara and State of New York, have invented new and useful Improvements in Welding-Controllers, of which the following is a full, clear, and concise and exact description, reference being had to the accompanying drawing, forming a part of this specification.

This invention relates to welding controllers.

It is particularly applicable to electric arc welding.

Arc welding usually involves striking an arc between two electrodes or between an object to be welded and an electrode, the heat of the arc being used for bringing the object to a welding temperature. The arc is generally obtained by completing the welding circuit by means of the welding electrodes and subsequently separating them to draw an arc. In order to prevent an excessive rush of current when the circuit is completed a current limiting means is associated with the welding circuit. Additional means is provided for controlling the current limiting means in order to increase the voltage across the arc to produce an arc of sufficient length and volume for welding purposes. The problem has been to provide a simple, efficient and practical controller.

One of the objects of the present invention is to provide an improved welding controller which will automatically regulate the welding current.

A further object is to provide a simplified welding controller which will automatically exclude the current limiting means when the resistance of the arc becomes high and which will automatically reinsert the resistance when the welding circuit is broken.

A further object is to provide a controller in which a single instrumentality having a single electromagnetic winding will automatically regulate the welding current and insure that the welding circuit is always in safe condition for operation.

Other objects and advantages of the invention will hereinafter appear.

The accompanying drawing illustrates an embodiment of the invention.

The views of the drawing are as follows:

Figure 1 is a diagrammatic view of a controller.

Fig. 2 is a diagrammatic view of a modification thereof.

Fig. 3 is a diagrammatic view of another modification thereof.

The controller shown in Fig. 1 will first be described.

The controller comprises in general a current limiting means 1, for regulating the current through the welding electrodes 2 and 3 and an automatic switch 4 for controlling the current limiting means.

The current limiting means comprises a resistance 1 of any suitable type connected in series with electrodes 2 and 3 across supply mains 5 and 6. This resistance limits the current when the circuit is completed and the resistance of the arc is small. It may be called for convenience the starting resistance. It is excluded from the circuit by the automatic switch 4 in a manner hereinafter described.

The automatic switch 4 has a movable member 7 controlled by the electromagnetic winding 8. The movable member is in the form of a bell crank lever pivoted adjacent the core of the electromagnetic winding 8 and it carries a contact 9 adapted to engage a stationary contact 10. The member 7 is normally biased to open position by gravity or by suitable means such as a spring. Any well-known expedient such as the adjusting screw 18 may be used to limit the movement of the member 7 and to adjust the length of the air gaps of the switch.

The construction of the switch is such that when the current in its winding is high it is held open, but when the current decreases to a predetermined value the switch is closed. This action is secured by the special construction of magnetic circuit and the location of the movable member. The portion 11 of the magnetic circuit is of restricted magnetic cross section. When the current in the winding is high this portion of the circuit cannot accommodate all the flux and accordingly a portion of it is shunted around through the arm 12 of the movable member 7. The pull on this arm due to the overflow flux is sufficient to hold a switch open against the pull of the core on the arm 13 of the movable member 7. When the welding electrodes are brought into engagement the current through the switch winding rises suddenly. This sudden rise of current causes the opposing pull of the overflow flux through member 12 to become effective to hold the switch open before the closing pull of the flux through member 11 has time to overcome the inertia of the switch. The necessary magnetic or mechanical inertia of the switch may be provided in various ways, such, for example, as by the weight of the moving parts. As the current in the winding decreases, the flux decreases until a point is reached where the most of the flux is accommodated by the member 11, at which time the pull on the arm 12 is relatively small and the switch is closed by the pull on the arm 13.

When the switch is open the resistance 1 is in series with the electrodes 2 and 3. When the switch is closed a circuit is completed in shunt to the resistance which may be traced as follows: from positive line 5 through electrodes 2 and 3, conductor 14, winding 8, contact 10, contact 9 and conductor 15 to the negative line 6.

The controller is shown in normal position with the switch 4 open and the starting resistance in series with the electrodes. The operation of the controller is as follows:

The welding circuit is completed at the electrodes 2 and 3 and current flows from the positive line 5 through the electrodes, conductor 14, winding 8 and resistance 1 to the negative line 6. The resistance prevents an excessive flow of current.

As the electrodes are separated the resistance of the arc formed therebetween increases and causes a corresponding decrease in the welding current. When the current decreases to a predetermined value the switch 4 closes and completes a shunt circuit around the resistance 1 so that sufficient current may flow to maintain an arc of proper length and volume for welding.

When the weld is completed and the welding circuit is broken the coil 8 of the switch is deënergized and the switch automatically opens and reinserts the resistance 1 in the welding circuit so that the controller is again in condition for operation.

Fig. 2 illustrates a modified form of controller in which a limiting resistance 16 is placed in the welding circuit between the electrodes 2 and 3 and the switch 4. This resistance prevents an absolute short-circuit between the supply mains 5 and 6. Its value may be adjusted so that sufficient current will flow through the welding circuit for welding purposes. The resistance 16 is not excluded from the circuit by the switch 4, and therefore serves as a protective means under all conditions. The operation of the controller shown in Fig. 2 is otherwise the same as that shown in Fig. 1.

Fig. 3 illustrates a further modification in which the limiting resistance 17 is placed in the circuit between the movable member 70 of switch 4 and the supply main 6. The limiting resistance is thus inserted in the welding circuit when the switch 4 closes. The winding 8 of the switch and the starting resistance 1 are placed in shunt to the limiting resistance by closure of the switch. One of the advantages of this controller is that the winding 8 does not carry the full welding current during the welding operation. As soon as the switch closes the winding is shunted and a comparatively small current flows therethrough. This current is of such a value that it will hold the switch closed without causing undue heating of the winding. The operation of the controller is in general the same as that described for the controller of Fig. 1.

It will thus be seen that an improved and simplified controller has been provided in which a single instrumentality having a single electromagnetic winding serves to delay the exclusion of the current limiting means from the welding circuit until the welding current has decreased to a predetermined value whereupon said means is positively excluded. The same instrumentality automatically reinserts the resistance when the welding circuit is broken. The circuit is accordingly automatically protected and the welding current automatically regulated by a combination which includes a minimum number of simple devices.

It should be understood that the controller shown is for purposes of illustration only, and that other structures may be devised which embody the invention and which are included within the spirit and scope of the appended claims:

1. An arc welding controller having a resistance in the circuit of the electrodes and a switch adapted to exclude said resistance and having a single operating winding responsive to the current in the electrode circuit, said switch adapted to be electrically held open under certain electrical conditions and closed under other electrical conditions to exclude the resistance from the electrode circuit.

2. An arc welding controller having a resistance in the circuit of the electrodes, and a switch adapted to exclude said resistance and having a single operating winding responsive to the current in the circuit of the electrodes for holding the switch open when the initial current in the electrode circuit is high and for closing it when the current decreases to a predetermined value to thereby exclude the resistance from the electrode circuit.

3. An arc welding controller provided with a resistance in the circuit of the electrodes to limit the initial welding current, a switch normally biased to open position for controlling said resistance, and an electromagnetic winding responsive to the current in the electrode circuit for holding said switch open when the initial current in the circuit is high and for closing it when the current decreases to a predetermined value to thereby exclude the resistance from the electrode circuit.

4. An arc welding controller provided with a resistance in the circuit of the electrodes to limit the initial welding current, a switch adapted to exclude said resistance and having an electromagnetic winding connected directly in the electrode circuit and adapted to hold the switch open when the initial current in the electrode circuit is high and to close it when the current decreases to a predetermined value to thereby exclude the resistance from the electrode circuit.

5. An arc welding controller having means in the circuit of the electrodes to limit the initial current, a switch adapted to exclude said current limiting means and having a single winding responsive to the current in the electrode circuit, said winding tending to close the switch to render the limiting means inoperative but adapted to delay the closure of the switch until the resistance of the arc has reached a certain value.

6. An arc welding controller provided with a resistance in the circuit of the electrodes, a switch for excluding the resistance from said circuit, said switch having a single operating winding governed by the electrical conditions in the electrode circuit and adapted to close the switch and to delay the closure thereof until the initial welding current has decreased to a predetermined value.

7. A welding controller having a resistance normally in the welding circuit, a switch adapted to exclude said resistance and having a single winding controlled directly by the welding current for holding the switch open when the current in the circuit is high and for closing it when the current decreases to a predetermined value to thereby exclude the resistance, said switch being biased to open position whereby the resistance is automatically reinserted when the welding circuit is broken.

8. An arc welding controller having a starting resistance in the circuit of the electrodes, a limiting resistance, a switch having a single electromagnetic winding responsive to the current in the electrode circuit adapted to hold the switch open under certain electrical conditions and to close it under other electrical conditions, said switch being adapted when closed to connect the winding and the starting resistance in shunt to the limiting resistance.

9. An arc welding controller having a starting resistance normally in the circuit of the electrodes, a limiting resistance, a switch having an electromagnetic operating winding connected directly in the electrode circuit to hold the switch open when the current is high and to close it when the current decreases to a predetermined value, said switch being adapted when closed to complete the circuit from the electrodes through a limiting resistance in shunt to the switch winding and the starting resistance.

10. An arc welding controller having a main welding circuit and an auxiliary starting circuit, a resistance in the starting circuit for limiting the initial welding current, and an electromagnetic switch having a single winding which is connected in the starting circuit, said switch being arranged to control the welding circuit and being adapted to remain open when the initial current through the starting circuit is high and to close when the current decreases to a predetermined value to thereby close the welding circuit.

11. An arc welding controller having a resistance in the circuit of the electrodes, and a switch adapted to exclude said resistance and having a single operating winding responsive to the current in the circuit of the electrodes, said switch being adapted to remain open when the initial current in the electrode circuit is high and being adapted to close when the current decreases to a predetermined value to thereby exclude the resistance from the electrode circuit.

In witness whereof, we have hereunto subscribed our names in the presence of witnesses.

EDWIN B. H. TOWER, Jr.
RAYMOND H. VAN NEST

Witnesses:
L. C. SCHAUTZ,
L. D. MASON,
EUGÉNIE LE ROUX,
JAS. L. COUGHLIN.